Nov. 16, 1965    R. W. POLLEY    3,218,214

THERMOPLASTIC SHRINK INHIBITOR

Filed Nov. 5, 1962

INVENTOR.
ROBERT W. POLLEY
BY

# United States Patent Office 3,218,214
THERMOPLASTIC SHRINK INHIBITOR
Robert W. Polley, Nashua, N.H., assignor to Sanders Associates, Inc., Nashua, N.H., a corporation of Delaware
Filed Nov. 5, 1962, Ser. No. 235,414
16 Claims. (Cl. 156—280)

This invention relates to a thermoplastic shrink inhibitor.

More specifically this invention relates to a thermoplastic shrink inhibitor for circuitry mounted on thermoplastic which circuitry and thermoplastic are exposed to a high temperature soldering process.

The printed circuit industry which relies heavily on thermoplastic laminates has been plagued by the fact that as soldering temperatures increase and thermoplastic melt temperatures decrease the plastics involved tend to shrink and warp thereby destroying precise circuit configurations. This is especially true of thin laminate structures.

The maintenance of circuit configuration is critical because each circuit has been designed so that the terminal portions of the circuit are in exactly the same position relative to each other and the apparatus to which they are connected. Conventional techniques of soldering such as depositing solder at each conductor terminal pad are extremely time consuming and prone to human error.

In order that circuitry of the type mentioned above to be truly commercially competitive the need for high speed production soldering and the use of inexpensive materials has been paramount.

Until the invention to be described hereafter, the fulfillment of the above requirements had not been accomplished. High speed soldering techniques have been developed but accompanying the high speed techniques is the fact that high temperature molten solder is always present.

Thermoplastics with good resistance to deformation at high temperatures are expensive. These more costly plastics also possess other superior properties, e.g., resistance to moisture absorption, aging effects, and corrosive atmospheric conditions to name a few. There are a myriad of applications which do not call for these last mentioned superior physical properties. Many of the inexpensive plastics have all the required physical properties required by the application but cannot be used because the plastic shrinks in the presence of molten solder. The use of the invention to be described hereafter permits the use of low-melt plastics; that is, relative to the high temperature of the solder employed; to produce a high quality soldered product.

It is therefore an object of this invention to create an inexpensive soldered circuit using a low melt-thermoplastic laminate.

Another object of this invention is to provide a thermoplastic and circuit laminate that resists shrinking when in the presence of a molten solder.

Yet another object of this invention is the provision of a quality soldered circuit laminate which is capable of utilizing high speed production techniques.

Another object of this invention is the ability to use inexpensive thermoplastics in conjunction with high temperature soldering processes.

Other objects, features and advantages will become apparent after consideration of the following detailed specification together with the appended drawings, in which FIG. 1 is a cross section of a piece of metal foil.

Figure 1:
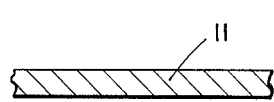
Figure 2:
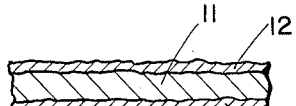
FIG. 2 is a cross section of a piece of metal foil which has been subjected to an oxidizing treatment.

Referring now to FIG. 1 to FIG. 6 where there is presented a graphic presentation of the process steps needed to produce a flexible printed circuit of the type in which the instant invention has been incorporated. In FIG. 1 there is shown a plain piece of copper foil 11 which copper foil upon being treated with an oxidizing solution takes on the appearance schematically shown in FIG. 2, where the copper foil 11 is seen to have acquired distinct layers of cupric oxide 12 and 13, which cupric oxide has a fine needlelike structure. The precise chemical reactions and procedures needed to produce the cupric finish and the fully encapsulated article to be described hereafter, have been described in detail in a patent granted to Victor Dahlgren, August 22, 1962, No. 2,997,521.

Figure 3:
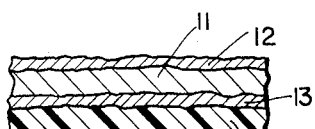
FIG. 3 is a cross section of "treated" foil and plastic laminate.
Figure 4:
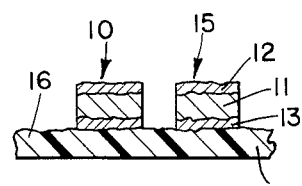
FIG. 4 is a cross section of an etched foil and copper laminate.

In FIG. 3 there is illustrated a metal and plastic laminate in which the needlelike structure of the cupric oxide layer 13 has been employed to secure a bond between the foil 11 and the thermoplastic lamina 14. Here the foil 11 and the lamina 14 have been brought together under heat and pressure to secure the requisite bond.

Figure 5:
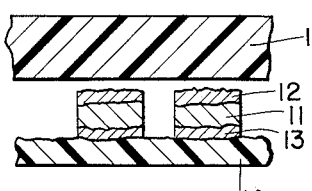
FIG. 5 depicts the etched foil laminate of FIG. 4 with and adjacent lamina of plastic to be bonded thereto.
Figure 6:
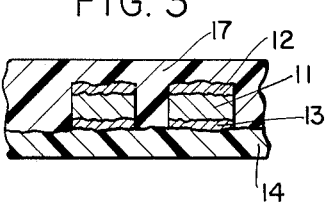
FIG. 6 is a cross section of a fully encapsulated etched foil and plastic laminate.

The foil 11 and cupric oxide coat 12 are then treated with a suitable resist material in a manner which will produce the desired circuit configuration. This is followed by an etching procedure which dissolves away portions of the oxide coatings 12 and 13 along with a portion of the foil 11. The removal of the unwanted portions of the foil leave exposed separate conductors 10 and 15. Of importance to future bonding is the creation of a roughened textured surface 16 on the thermoplastic lamina 14. The presence of this roughened surface 16 facilitates the bonding of a subsequently applied thermoplastic covercoat 17 as shown in FIGS. 5 and 6. In FIG. 6 the structure that results from the application of heat and pressure to the covercoat 17 and base laminate of conductors 10, 15 and base lamina 14 is depicted. The covercoat 17 has been bonded to the base lamina 14 with the roughened surface providing an autogenous weld.

Figure 7:
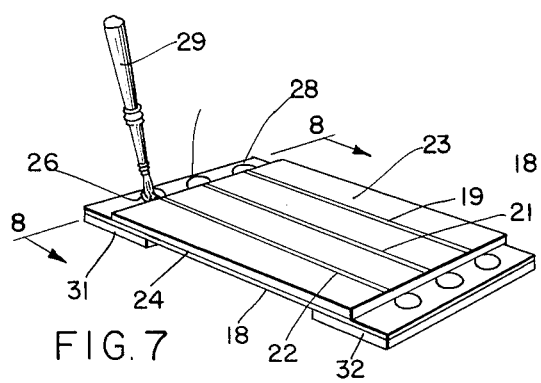
FIG. 7 is a perspective view of a typical printed circuit incorporating the invention.
Figure 8:
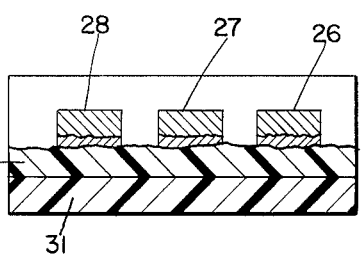
FIG. 8 is a section taken along the lines 8—8 in FIG. 7.

Referring now to FIG. 7 and FIG. 8 where there is portrayed a perspective showing of a piece of flexible printed circuitry incorporating the invention. As already described above the circuit laminate is comprised of a base laminate 18 which has bonded thereto a plurality of conductors 19, 21, 22, which are located in sandwich fashion between a thermoplastic covercoat 23 and the thermoplastic lamina 18, the two plastic layers being bonded together by an autogenous weld 24. At either end of the laminate there are exposed conductor terminals such as 26, 27 and 28. It is at these terminals that the solder must be applied. Directly beneath the conductor terminals 26, 27 and 28, and the adjacent base lamina 18 there is applied a coating or covering 31 which forms the basis for the claims of invention. This covering which may be removable is applied wherever there are terminals which are to be soldered. It is well known that thermoplastic base lamina 18 has a predetermined melt temperature determined by its chemical composition. The covering that is applied must have dimensional stability at the melt temperature of the thermoplastic base lamina 18 and its covercoat lamina 23 in order that the resulting laminate comprised of the covercoat 23, the base lamina 18 and covering 31 have effectively the dimensional stability of the coating 31. Each of the terminals are coated with a fluxing material, here being shown applied with a small brush 29. It is common practice to flux the entire circuit which subsequently permits the circuit to pass over the solder wave without drops or beads collecting on the plastic. It is, of course, understood that there are a number of ways in which the flux may be applied but this aspect of the process is not deemed to be part of the invention.

Following the application of flux, as required, the terminals are coated with solder by subjecting the exposed conductor terminals and thermoplastic laminate 18, 23, to a source of molten solder. In the situation where the temperature of the molten solder exceeds the melt temperature of the plastic laminate there is a great tendency for the plastic to shrink and warp. The presence of the dimensionally stable covering inhibits this shrinking and thereby avoids the normal distortion of the circuit's configuration had not the shrink inhibiting coating been present.

There are a variety of covering materials that will suffice and several ways in which the coating may be applied. These will be described more fully hereafter. In making a selection of a suitable shrink inhibiting covering for any application the controlling concept of this invention requires the covering material to have dimensional stability at the melt temperature of the thermoplastic involved. There are other considerations to be kept in mind such as the environment which the circuitry will ultimately be used in and whether it is desirable to leave the shrink inhibiting covering on the circuit. If the atmospheric conditions surrounding the circuit contains moisture in significant quantity, then the use of a fibrous material such as paper or cardboard may be rejected as a choice in favor of a moisture impervious coating such as pressure sensitive Mylar tape.

Figure 9:
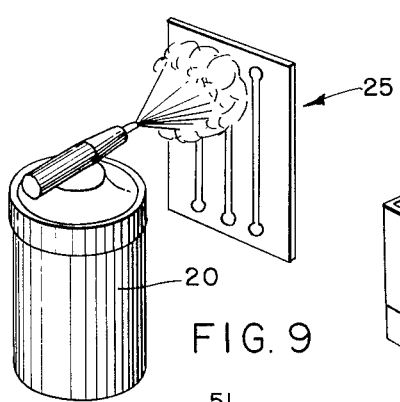
FIG. 9 is a perspective view depicting one step of the process embodying the invention.

The stress of high production runs may dictate the application of the shrink inhibiting covering by spraying as shown in FIG. 9 where a pressurized spray can 20 is utilized to apply a covering to circuit 25. On the other hand, painting techniques are also possible. Exemplary of a solution that dries to provide the requisite dimensional stability at present is the use of sodium silicate, commonly referred to as "waterglass."

Weight and space considerations may dictate the use of a covering and related adhesive that is readily removable. If such is the case the liquid which is selected to be sprayed or painted may be removed by a solvent or, if the liquid when hardened is brittle, the circuit may be flexed and the fractured material will readily flake off. Such is the case when "waterglass" is used. On the other hand the selection of a suitable adhesive may permit the easy removal of the covering by a conventional peeling technique.

Figure 10:
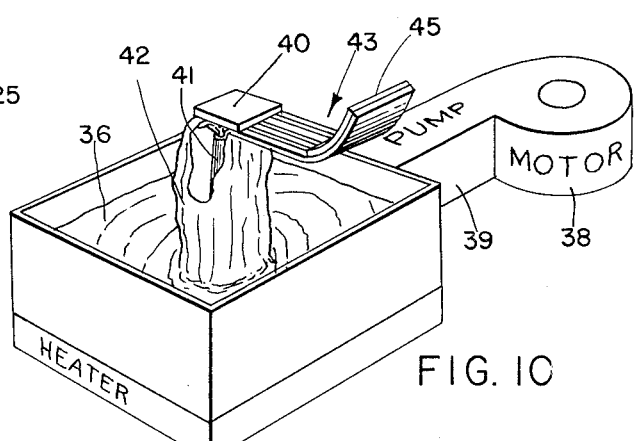
FIG. 10 is a perspective view of a fountain of solder and a laminate incorporating the invention.

Referring now to FIG. 10, where there is illustrated schematically a fountain soldering apparatus which lends itself to high production soldering by providing a continuous flow of molten solder to a raised location for ease in application. For a full description of the precise operation of the fountain soldering apparatus, reference is made to Patent No. 3,058,441, issued October 16, 1962.

The fountain soldering unit in FIG. 10 is comprised of a solder vessel 34 filled with a molten solder 36 which is maintained in its molten state by a heating unit 37. Directly connected to the vessel 34 is a pump 39 and motor 38. The motor 38 drives the pump 39 which, in turn, conveys the molten solder 36 in a continuous flow via a conduit 41 to establish a fountain of solder 42. It is this fountain or wave as it may be termed that is utilized to apply solder to the terminals of the circuit involved. As can be seen in FIG. 10, a typical circuit 43 with a pair of shrink inhibitors 40, 45, is being drawn over the fountain of solder 42. It will be noted that a significant area of the circuit 43 comes in contact with the molten solder in the process. Graphic evidence of the effectiveness of the shrink inhibitor coating can readily be seen in a study of FIG. 11 and FIG. 12.

Figures 11, 12:
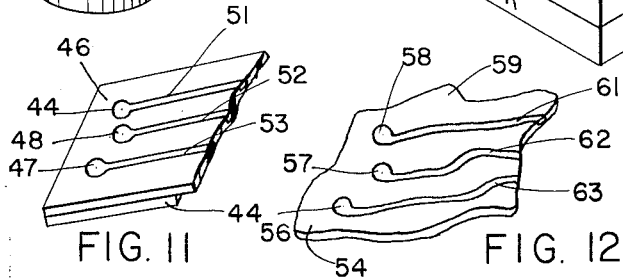
FIG. 11 is a perspective view of a soldered terminal portion of circuit laminate that incorporates the invention.
FIGURE 12 is a perspective view of a soldered terminal portion of circuit laminate that does not incorporate the invention.

The portion of a circuit depicted in FIG. 11 has had the benefit of a shrink inhibiting coat 44. It will be noticed that the circuit laminate 46 has in nowise been distorted or shrunk by the surface immersion in the molten solder as shown in FIG. 11. At the ends of the conductors 51, 52, 53, there are uniformly soldered terminals 44, 47, 48. The conductors have maintained their relative positions and the circuit is now ready for placement in the apparatus for which it was designed.

In contrast to perfect symmetry retained by the circuit incorporating the invention reference is made to FIG. 12, where a portion of a circuit has been depicted in which the invention was not employed. In this case the circuit laminate 54 is grossly shrunk and deformed 59 and the conductors 61, 62, 63, while having been soldered at their respective terminals 56, 57, 58, have lost their designed symmetry. In some cases where the conductors are in close proximity the warping and shrinking may be so severe as to bring the conductors into mutual contact which would result in a shorted circuit.

While the preferred embodiment has shown the shrink inhibiting cover on the under side of the laminate it would be possible to locate the cover on the top side of the laminate with suitable openings therein adjacent each terminal. The use of materials that turn into an expanded foam in the presence of heat are also contemplated as a shrink inhibiting cover material for application to the top side of the laminate.

While there has been hereinbefore described what are considered preferred embodiments of the invention, it will be apparent that many and various changes and modifications may be made with respect to the embodiments illustrated, without departing from the spirit of the invention. It will be understood, therefore, that all changes and modifications as fall fairly within the scope of the present invention as defined in the appended claims are to be considered as part of the present invention.

What is claimed is:

1. A soldering process for a thermoplastic lamina with a circuit configuration bonded to said lamina, said circuit having terminal portions, and said thermoplastic lamina having a predetermined melting temperature which process is comprised of the following steps:
    (a) applying to said lamina in the region of said terminal portions a covering having dimensional stability at the melt temperature of said thermoplastic,
    (b) coating said terminal portions with solder by subjecting said lamina in the region of said terminals to molten solder the temperature of said solder exceeding the melt temperature of said thermoplastic.

2. A soldering process for a thermoplastic lamina with a circuit configuration bonded to a top side of said lamina, said circuit having terminal portions, and said thermoplastic lamina having a predetermined melting temperature, which process is comprised of the following steps:
    (a) applying to the under side of said lamina in the region of said terminal portions a covering having dimensional stability at the melt temperature of said thermoplastic,
    (b) coating said terminal portions with solder by subjecting said top side of said lamina in the region of said terminals to molten solder the temperature of said solder exceeding the melt temperature of said thermoplastic.

3. A soldering process for a thermoplastic lamina with a circuit configuration bonded to a top side of said lamina, said circuit having terminal portions, and said thermoplastic lamina having a predetermined melting temperature which process is comprised of the following steps:
  (a) applying to the under side of said lamina in the region of said terminal portions a removable covering having dimensional stability at the melt temperature of said thermoplastic,
  (b) coating said terminal portions with solder by subjecting said topside of said lamina in the region of said terminals to molten solder the temperature of said solder exceeding the melt temperature of said thermoplastic, whereby said removable covering maintains the dimensional stability of said thermoplastic when said thermoplastic temperature is in its melt region.

4. A soldering process for a thermoplastic lamina with a circuit configuration bonded to a top side of said lamina, said circuit having terminal portions, and said thermoplastic lamina having a predetermined melting temperature which process is comprised of the following steps:
  (a) applying to the under side of said lamina in the region of said terminal portions a removable covering having dimensional stability at the melt temperature of said thermoplastic, whereby the resulting laminate has effectively the dimensional stability of said removable covering,
  (b) coating said terminal portions with solder by subjecting said top side of said lamina in the region of said terminals to molten solder the temperature of said solder exceeding the melt temperature of said thermoplastic, whereby said removable covering maintains the dimensional stability of said thermoplastic when said thermoplastic's temperature is in its melt region.

5. A soldering process for a thermoplastic lamina with a circuit configuration bonded to a top side of said lamina, said circuit having terminal portions, and said thermoplastic lamina having a predetermined melting temperature which process is comprised of the following steps:
  (a) applying to the under side of said lamina in the region of said terminal portions a covering having dimensional stability at the melt temperature of said thermoplastic, whereby the resulting laminate has effectively the dimensional stability of said covering,
  (b) coating said terminal portions with solder by subjecting said top side of said lamina in the region of said terminals to molten solder the temperature of said solder exceeding the melt temperature of said thermoplastic.

6. A thermoplastic shrink inhibitor for immersion soldered printed circuitry comprised of:
  (a) a thermoplastic lamina with a circuit configuration bonded to said lamina, said circuit having terminal portions and said thermoplastic lamina having a predetermined melting temperature,
  (b) said thermoplastic lamina having a readily removable covering on said lamina, said covering having dimensional stability at the melt temperature of said thermoplastic,
  (c) said covering providing dimensional stability to said thermoplastic when said circuit's terminal portions and surrounding thermoplastic are in the intimate presence of a molten solder which temperature exceeds the melt temperature of said thermoplastic.

7. A thermoplastic shrink inhibitor for immersion soldered circuitry comprised of:
  (a) a thermoplastic lamina with a circuit configuration bonded to a top side of said lamina, said circuit having terminal portions and said thermoplastic lamina having a predetermined melting temperature,
  (b) said thermoplastic lamina having a covering on the under side of said lamina, said covering having dimensional stability at the melt temperature of said thermoplastic,
  (c) said ocvering providing dimensional stability to said thermoplastic when said circuit's terminal portions and surrounding thermoplastic are in the intimate presence of a molten solder which temperature exceeds the melt temperature of said thermoplastic.

8. A thermoplastic shrink inhibitor for immersion soldered circuitry comprised of:
  (a) a thermoplastic lamina with a circuit configuration bonded to a top side of said lamina, said circuit having terminal portions and said thermoplastic lamina having a predetermined melting temperature,
  (b) said thermoplastic lamina having a removable covering on the under side of said lamina, said removable covering having dimensional stability at the melt temperature of said thermoplastic,
  (c) said removable covering providing dimensional stability to said thermoplastic when said circuit's terminal portions and surrounding thermoplastic are in the intimate presence of a molten solder which temperature exceeds the melt temperature of said thermoplastic.

9. A soldering process for a thermoplastic laminate with a circuit configuration encapsulated in said laminate, said circuit having exposed terminal portions, and said thermoplastic lamina having a predetermined melting temperature which process is comprised of the following steps:
  (a) applying to said laminate in the region of said exposed terminal portions a covering having dimensional stability at the melt temperature of said thermoplastic, said
  (b) coating said exposed terminal portions with solder by subjecting said laminate in the region of said terminals to molten solder the temperature of said solder exceeding the melt temperature of said thermoplastic.

10. A soldering process for a thermoplastic laminate with a circuit configuration encapsulated in said laminate, said circuit having a plurality of exposed terminal portions, and said thermoplastic lamina having a predetermined melting temperature which process is comprised of the following steps:
  (a) applying to said laminate in the regions of said plurality of exposed terminal portions a covering having dimensional stability at the melt temperature of said thermoplastic, and
  (b) coating said plurality of exposed terminal portions with solder by subjecting said laminate in the region of said terminals to molten solder for a period sufficient to coat said terminals the temperature of said solder exceding the melt temperature of said thermoplastic.

11. The soldering process of claim 5 wherein said covering is of a fibrous material.

12. The solder process of claim 5 wherein said covering is a pressure sensitive adhesive tape.

13. The solder process of claim 5 wherein said covering is waterglass.

14. The thermoplastic shrink inhibitor of claim 7 wherein said covering is of a fibrous material.

15. The thermoplastic shrink inhibitor of claim 7 wherein said covering is a pressure sensitive adhesive tape.

16. The thermoplastic shrink inhibitor of claim 7 wherein said covering is waterglass.

References Cited by the Examiner
UNITED STATES PATENTS
2,932,599    4/1960    Dahlgren.

RICHARD D. NEVIUS, *Primary Examiner.*